United States Patent [19]

Pham

[11] Patent Number: 5,260,673
[45] Date of Patent: Nov. 9, 1993

[54] π/4 DIFFERENTIAL ENCODING FOR DIGITAL CELLULAR MOBILE SYSTEMS

[75] Inventor: Hiep Pham, Gaithersburg, Md.

[73] Assignee: Hughes Aircraft Company, Los Angeles, Calif.

[21] Appl. No.: 933,122

[22] Filed: Aug. 21, 1992

[51] Int. Cl.$^5$ .......................................... H04L 27/20
[52] U.S. Cl. .................................... 332/103; 375/56; 375/67; 332/104
[58] Field of Search .................. 332/103, 104; 375/52, 375/56, 67

[56] References Cited

U.S. PATENT DOCUMENTS

| | | | |
|---|---|---|---|
| 4,504,802 | 3/1985 | Heatherington | 375/52 X |
| 5,020,076 | 5/1991 | Cahill et al. | 332/103 X |
| 5,210,775 | 5/1993 | Takahara et al. | 332/103 X |

Primary Examiner—Siegfried H. Grimm
Attorney, Agent, or Firm—Gordon R. Lindeen, III; Wanda K. Denson-Low

[57] ABSTRACT

A π/4 differential phase shift encoder that is implemented by simple digital logic circuits or a small number of digital signal processor instructions. The hardware logic circuit which implements π/4 differential phase shift encoding first converts a serial input binary data stream with a serial-to-parallel converter into two separate binary sequences. These sequences are then applied to a π/4 differential encoder which employs a table lookup to generate the final π/4 differential phase shift encoding. The software implementation of the π/4 differential phase shift encoding technique generates the phase shift encoded signal using tables of values based on sequences of the input serial binary data stream.

4 Claims, 3 Drawing Sheets

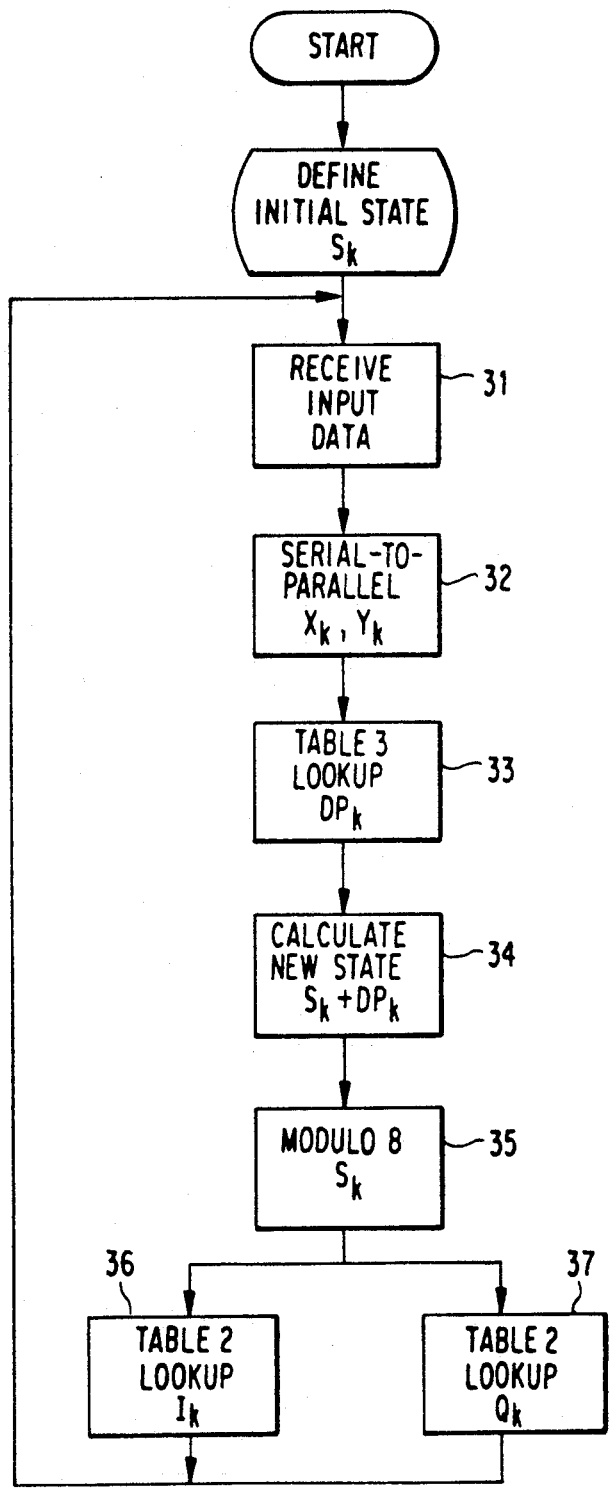

π/4 DIFFERENTIAL ENCODING FOR DIGITAL CELLULAR MOBILE SYSTEMS

BACKGROUND OF THE INVENTION

1. Field of the Invention

The present invention generally relates to digital cellular mobile communications systems and, more particularly, to a scheme for π/4 phase shift differential encoding which reduces the complexity of the encoder.

2. Description of the Prior Art

Digital cellular mobile communications present many design challenges for the realization of a practical and commercially viable system. On the one hand, a considerable amount of data, both voice and control, must be transmitted between a base station and a number of mobile stations. The amount of data needed for the system is dictated in part on the quality of the voice transmission required for the system and the control functions implemented by the system. On the other hand, the mobile stations need to be both inexpensive and lightweight, and this dictates, among other things, the use of a nonlinear transmitter amplifier. Although weight is typically not a factor in the base station, expense is, making a nonlinear transmitter amplifier desirable there as well.

Differential or quadrature phase shift keying (QPSK) is a popular technique for transmitting large amounts of data within a limited bandwidth. However, the use of nonlinear amplifiers in a QPSK system causes the transmitted spectrum to exceed the bandwidth assigned to a transmission channel. A solution to this problem is to use π/4 differential phase encoding which exhibits much less spread in spectrum than QPSK as a result of nonlinear amplification and also differential demodulation is simpler. Unfortunately, proposed techniques for implementing π/4 differential phase shift encoding are both complex and expensive, offsetting any economies realized by the use of nonlinear amplifiers.

SUMMARY OF THE INVENTION

It is therefore an object of the present invention to provide a π/4 differential phase shift encoder that can be implemented by using simple digital logic circuits or a small number of digital signal processor instructions.

According to one aspect of the invention, there is provided a simple hardware logic circuit which implements π/4 differential phase shift encoding. A serial input binary data stream is converted by a serial-to-parallel converter into two separate binary sequences which, together, define the in phase and quadrature signals. These sequences are then applied to a π/4 differential encoder which employs a table lookup to generate the final π/4 differential phase shift encoding.

According to another aspect of the invention, there is provided a simple software implementation of the π/4 differential phase shift encoding technique. The software generates the phase shift encoded signal using tables of values based on sequences of the input serial binary data stream.

BRIEF DESCRIPTION OF THE DRAWINGS

The foregoing and other objects, aspects and advantages will be better understood from the following detailed description of a preferred embodiment of the invention with reference to the drawings, in which:

FIG. 5 is a flow diagram illustrating the logic of the software implementing the π/4 differential phase shift encoding according to the invention.

DETAILED DESCRIPTION OF A PREFERRED EMBODIMENT OF THE INVENTION

Figure 1:
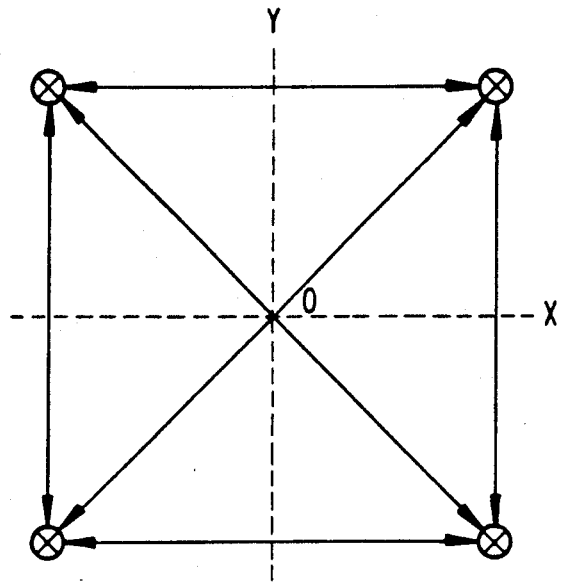
FIG. 1 is a constellation diagram of a quadrature phase shift keying signal.

Referring now to the drawings, and more particularly to FIG. 1, there is shown a constellation diagram of the quadrature phase shift keying (QPSK) scheme. The constellation diagram shows points in each of four quadrants of a cartesian coördinate system with X and Y axes. According to this diagram, the modulated signal, represented by each of the four points, has phase changes that differ by multiples of π/2.

The phase change of a π/4 differential system, DP (for differential phase), is defined in radians (angles) according to table 1 below:

TABLE 1

| | Differential Phase Values Derived From Input Signals | |
|---|---|---|
| $X_k$ | $Y_k$ | DIFFERENTIAL PHASE. DP |
| 0 | 0 | π/4 (45°) |
| 0 | 1 | 3π/4 (135°) |
| 1 | 0 | −π/4 (−45°) |
| 1 | 1 | −3π/4 (−135°) |

Figure 2:
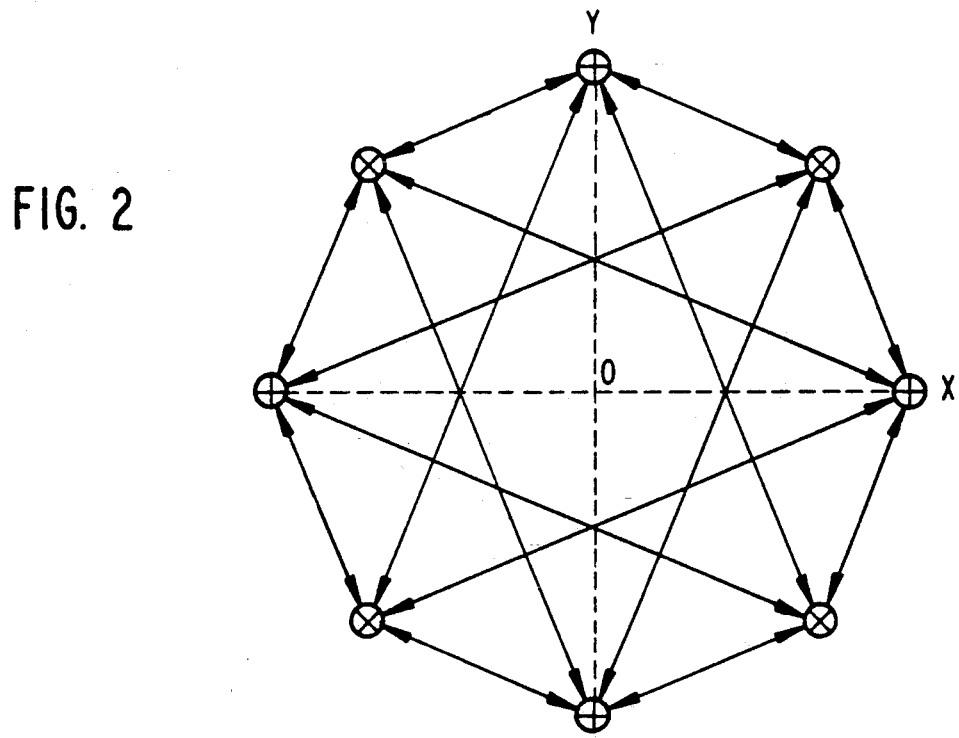
FIG. 2 is a constellation diagram of a π/4 modulated signal.

For π/4 differential encoding, the output signals $I_k$ and $Q_k$ can take one of five values, $0, \pm 1, \pm\sqrt{2}$ resulting in the constellation shown in FIG. 2. This constellation, like that of FIG. 1, shows points in each of four quadrants of a cartesian coördinate system and on the X and Y axes, where each of the points differs in phase from adjacent points by π/4. Table 2 defines the state values of the output signals, $I_k$ and $Q_k$:

TABLE 2

| | State Values of the Output Signals | |
|---|---|---|
| STATE VALUE | $I_k$ | $Q_k$ |
| 000 | 0.0 | −1.0 |
| 001 | $-\sqrt{2}$ | $-\sqrt{2}$ |
| 010 | −1.0 | 0.0 |
| 011 | $-\sqrt{2}$ | $+\sqrt{2}$ |
| 100 | 0.0 | +1.0 |
| 101 | $+\sqrt{2}$ | $+\sqrt{2}$ |
| 110 | +1.0 | 0.0 |
| 111 | $+\sqrt{2}$ | $-\sqrt{2}$ |

According to a first embodiment of the invention implemented in hardware, an input binary data stream, $b_m$, is first converted into two separate binary streams $X_k$ and $Y_k$. The digital data sequences $X_k$ and $Y_k$ are encoded into $I_k$ and $Q_k$ according to the following equations:

$$I_k = I_{k-1} \cos(DP(X_k, Y_k)) - Q_{k-1} \sin(DP(X_k, Y_k)) \quad (1)$$

$$Q_k = I_{k-1} \sin(DP(X_k, Y_k)) + Q_{k-1} \cos(DP(X_k, Y_k)) \quad (2)$$

where $I_{k-1}$ and $Q_{k-1}$ are the amplitudes at the previous pulse time. Table 3 defines the phase change as a 3-bit value, as follows:

TABLE 3

| | Phase Change in Binary Format | |
|---|---|---|
| $X_k$ | $Y_k$ | PHASE CHANGE |
| 0 | 0 | 001 |
| 0 | 1 | 011 |
| 1 | 0 | 111 |
| 1 | 1 | 101 |

Figure 3:
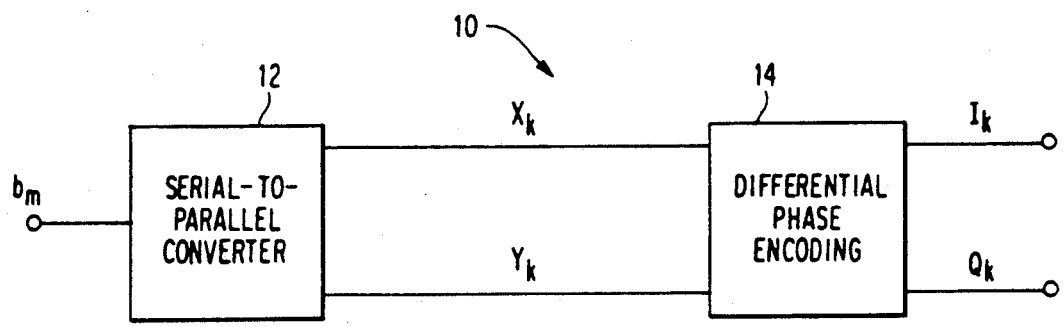
FIG. 3 is a high level block diagram of the π/4 differential encoding system according to the invention.

FIG. 3 is a high level block diagram of the $\pi/4$ differential encoding. The binary data stream, $b_m$, entering the modulator 10 is converted into two separate data sequences $X_k$ and $Y_k$ by serial-to-parallel converter 12. The serial-to-parallel converter 12 is known in the art and typically takes the form of a clocked counter stage which alternately enables two AND gates to pass alternating bits in the binary data stream $b_m$ to one of two serial-in, parallel-out shift registers. The digital data sequences $X_k$ and $Y_k$ from the two shift registers are encoded into $I_k$ and $Q_k$ by encoder 14.

Figure 4:
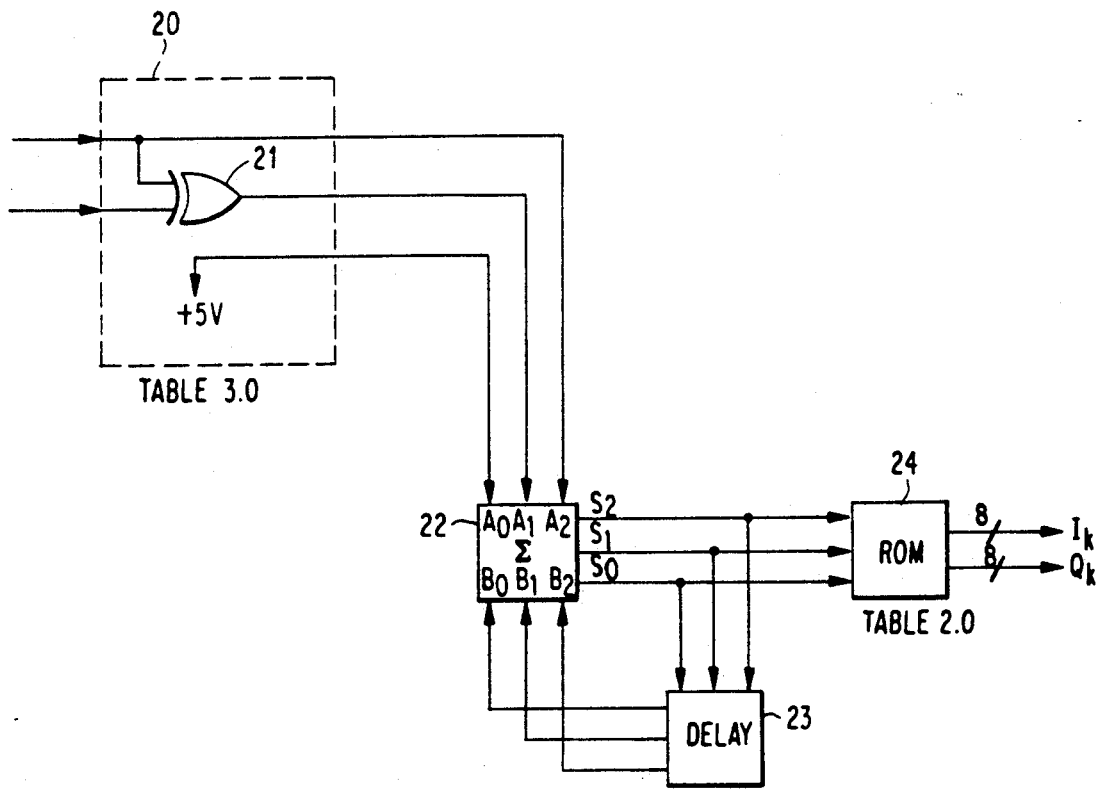
FIG. 4 is a block diagram of a simple hardware circuit implementing the π/4 differential encoder according to the invention.

FIG. 4 shows the logic of the encoder 14. The input sequences $X_k$ and $Y_k$ are modified in block 20 according to Table 3 and input to the 3-bit adder 22. More specifically, in block 20 the least significant bit (LSB) is hardwired to a high value (i.e., a binary "1"), the most significant bit (MSB) is directly connected to $X_k$, and the intermediate bit is the output of Exclusive OR gate 21 which receives as its inputs $X_k$ and $Y_k$. The other input to the adder 22 is the delayed output $S_{k-1}$ from delay 23. The output state from the adder 22 is used as the address of read only memory (ROM) 24 whose contents are defined in Table 2. The outputs of the ROM 24 are the in phase, $I_k$, and quadrature phase, $Q_k$, signals of the $\pi/4$ differential encoder.

The transmitter of cellular telephones typically includes a digital signal processor (DSP), such as the TI C51 series of DSPs manufactured by Texas Instruments, Inc. Therefore, instead of implementing the hardware logic shown in FIG. 4, the algorithm may be implemented in software according to a second embodiment of the invention, as illustrated by the flow diagram shown in FIG. 5. First, the initial state of $I_{k-1}$ and $Q_{k-1}$ is defined as state $S_{k-1}$. The process in FIG. 5 begins at function block 31 by receiving the input data. Then in function block 32, the serial input data is converted into $X_k$ and $Y_k$. In function block 33, the differential phase value, $DP_k$, is determined by accessing Table 3 $[X_k, Y_k]$. A new state, TEMP, is calculated in function block 34 as TEMP$=S_{k-1}+DP_k$. Then, in function block 35, modulo 8 computation is applied to the new state as $S_k=$TEMP$\cdot$AND$\cdot$7. The analog value for the I amplitude is determined in function block 36 as $I_k=$Table 2 $[S_k]$ (upper byte), and the analog value for the Q amplitude is determined in function block 37 as $Q_k=$Table 2 $[S_k]$ (lower byte). The process then loops back to function block 31 and repeats for all the data to be encoded.

While the invention has been described in terms of hardware and software embodiments, those skilled in the art will recognize that the invention can be practiced with modification within the spirit and scope of the appended claims.

Having thus described my invention, what I claim as new and desire to secure by Letters Patent is as follows:

1. A $\pi/4$ differential phase shift encoder comprising:
   serial-to-parallel converter means for converting an input binary data stream, $b_m$, into first and second data sequences $X_k$ and $Y_k$;
   first logic means for receiving said data sequences $X_k$ and $Y_k$ and generating a 3-bit binary code;
   adder means for receiving as a first input the 3-bit binary code generated by said first logic means and producing a 3-bit sum output;
   delay means for delaying said 3-bit sum output and providing the delayed 3-bit sum output to a second input of said adder means; and
   table lookup means receiving said 3-bit sum output as an address and outputting signals, $I_k$ and $Q_k$, according to a second table, said signals $I_k$ and $Q_k$ being defined according to the following equations:

$$I_k = I_{k-1} \cos(DP(X_k, Y_k)) - Q_{k-1} \sin(DP(X_k, Y_k)) \quad (3)$$

$$Q_k = I_{k-1} \sin(DP(X_k, Y_k)) + Q_{k-1} \cos(DP(X_k, Y_k)) \quad (4)$$

where $I_{k-1}$ and $Q_{k-1}$ are the amplitudes at the previous pulse time and DP is the differential phase.

2. The $\pi/4$ differential phase shift encoder recited in claim 1 wherein said 3-bit binary code is defined according to a first table as

| $X_k$ | $Y_k$ | PHASE CHANGE |
|---|---|---|
| 0 | 0 | 001 |
| 0 | 1 | 011 |
| 1 | 0 | 111 |
| 1 | 1 | 101 | and wherein said signals, $I_k$ and $Q_k$, are defined according to a second table as

| STATE VALUE | $I_k$ | $Q_k$ |
|---|---|---|
| 000 | 0.0 | $-1.0$ |
| 001 | $-\sqrt{2}$ | $-\sqrt{2}$ |
| 010 | $-1.0$ | 0.0 |
| 011 | $-\sqrt{2}$ | $+\sqrt{2}$ |
| 100 | 0.0 | $+1.0$ |
| 101 | $+\sqrt{2}$ | $+\sqrt{2}$ |
| 110 | 1.0 | 0.0 |
| 111 | $+\sqrt{2}$ | $-\sqrt{2}$ |

3. A process implemented on a microprocessor for generating $\pi/4$ differential phase shift encoding comprising the steps of:
   receiving an input binary data stream to be encoded and outputting first and second data sequences $X_k$ and $Y_k$ from a serial to parallel converter;

accessing a first lookup table to determine the differential phase value, $DP_k$;

calculating a new state, TEMP, as $TEMP = S_{k-1} + DP_k$;

applying modulo 8 to the new state as $S_k = TEMP \cdot AND \cdot 7$;

determining the analog values for I and Q amplitudes by accessing a second lookup table; and repeating the process for all the data to be encoded.

4. The process for generating $\pi/4$ differential phase shift encoding recited in claim 3 wherein said first table is defined as

| $X_k$ | $Y_k$ | PHASE CHANGE |
|---|---|---|
| 0 | 0 | 001 |
| 0 | 1 | 011 |
| 1 | 0 | 111 |
| 1 | 1 | 101 | and wherein said second table is defined as

| STATE VALUE | $I_k$ | $Q_k$ |
|---|---|---|
| 000 | 0.0 | $-1.0$ |
| 001 | $-\sqrt{2}$ | $-\sqrt{2}$ |
| 010 | $-1.0$ | 0.0 |
| 011 | $-\sqrt{2}$ | $+\sqrt{2}$ |
| 100 | 0.0 | $+1.0$ |
| 101 | $+\sqrt{2}$ | $+\sqrt{2}$ |
| 110 | $+1.0$ | 0.0 |
| 111 | $+\sqrt{2}$ | $-\sqrt{2}$ |

* * * * *